United States Patent Office.

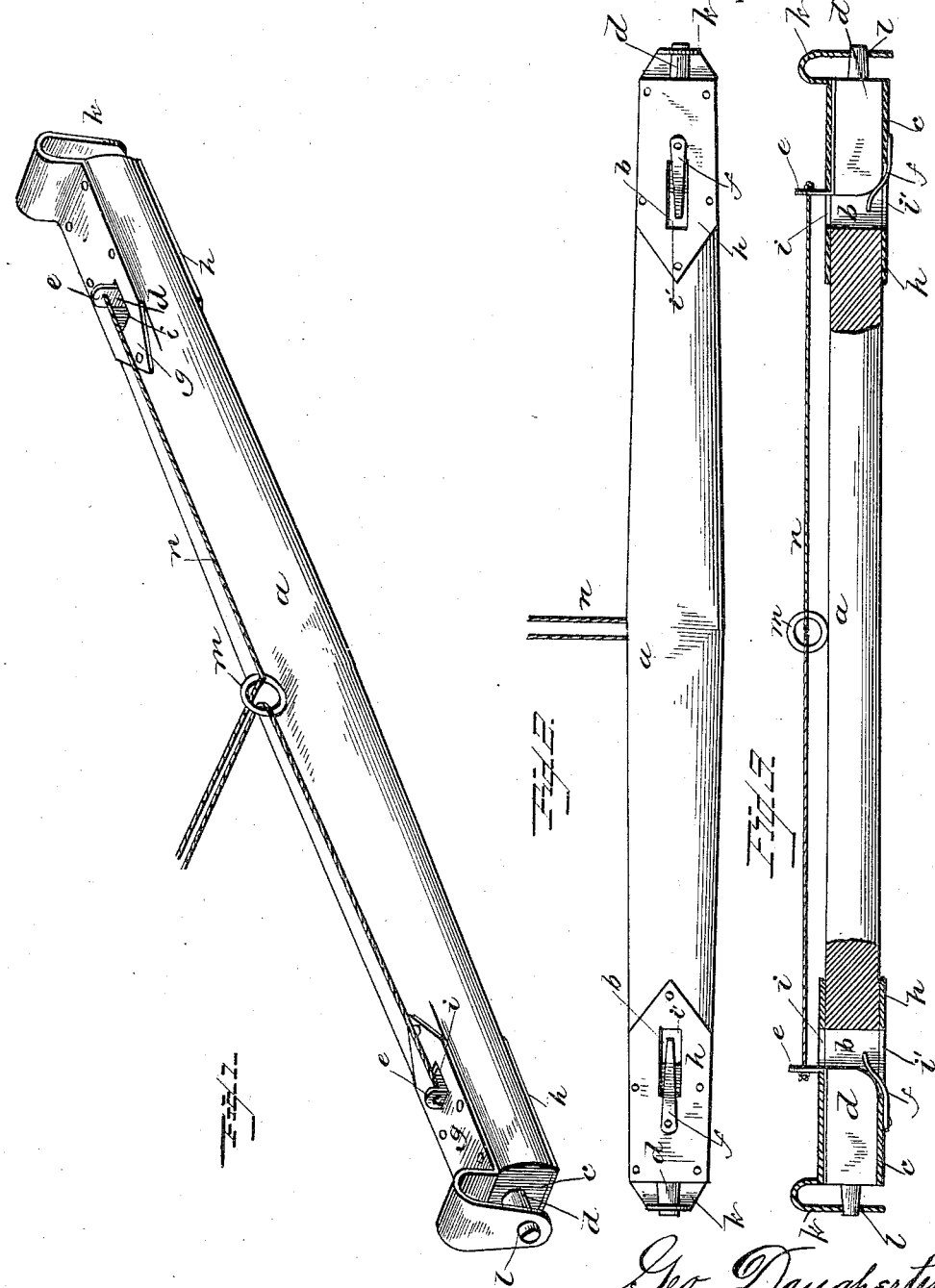

GEORGE DAUGHERTY AND SAMUEL THOMAS, OF LETART, WEST VIRGINIA.

HORSE-DETACHER.

SPECIFICATION forming part of Letters Patent No. 305,746, dated September 30, 1884.

Application filed April 8, 1884. (No model.)

*To all whom it may concern:*

Be it known that we, GEORGE DAUGHERTY and SAMUEL THOMAS, citizens of the United States, residing at Letart, in the county of Mason and State of West Virginia, have invented a new and useful Horse-Detacher, of which the following is a specification, reference being had to the accompanying drawings.

This invention has relation to horse-detachers designed to detach unmanageable or runaway horses instantly from the vehicle to which they are attached, and thereby save life and property; and it consists in the construction and novel arrangement of parts, as will be hereinafter fully described, and particularly pointed out in the claim.

Figure 1 is a view in perspective of a single-tree with our improvements. Fig. 2 is a bottom view, and Fig. 3 is a vertical longitudinal sectional view.

Referring by letter to the accompanying drawings, $a$ designates the single-tree, which is provided near each end with a recess, $b$, extending entirely through it vertically. The ends of the single-tree are bored centrally at $c$ into the recesses $b$. A bolt, $d$, with an eye, $e$, at its inner end, is placed in each of the recesses $b\ b$, and its point is projected outwardly through the bore $c$, and is held in this, its normal position, by a spring, $f$, curving upwardly against its inner end within the recess. The single-tree irons $g\ g$ and $h\ h$ are slotted, their slots $i\ i'$ registering with the recesses $b\ b$, and are secured in any suitable manner to the single-tree at its ends. The upper irons, $i$, carry the downwardly-bent trace-guard hooks $k$, which have perforations $l$ aligned with the bores $c$, which perforations receive the points of the bolts $d$, which pass through the eyes of the tugs when the horse is attached to the vehicle and hold the tugs in place. The single-tree is provided at its middle with an eye, $m$, by which it is connected to the thill-bar, and through this eye $m$ the cord $n$, attached to the eyes on the inner ends of the spring-bolts, passes, and from thence over the dash-board or through an opening in the same to within convenient reach of the driver or other occupant of the vehicle. The springs hold the bolts outwardly at all times, except when the cord is pulled upon to draw them in, and when a gentle pull is made upon the cord $n$ the bolts will be withdrawn from the tug-eyes and the tugs will instantly drop from the trace-guard hooks.

The detacher may be made entirely of iron, or its ends may be cast of malleable iron and attached to the wood. The springs will not let the bolts work back accidentally, and as the cord pulls directly toward the middle of the single-tree it cannot fail to detach the horse every time it is pulled. It can be used with double teams equally as well as with a single horse, double cords only being required, and they may be connected at the dash-board or other suitable point, so that a single pull will operate to detach both horses.

This device is simple, superior to others because of its certainty of action, strength, and durability. It can also be made very neat in appearance.

For a one-horse vehicle we employ a crooked iron on the shafts, so that the holdback-straps slip out when the traces are detached.

We are aware that the bolts of a horse-detacher have been operated by wires attached to a disk at the middle of a hollow single-tree, held in place by the bolt that connects the single-tree to the rear cross-bar of the thills, said disk being operated by a chain connected to an arm on said disk and leading to the driver's seat, and we make no claim to said construction.

Having thus fully described our invention, what we claim as new, and desire to secure by Letters Patent of the United States, is—

In a horse-detacher, the combination, with the single-tree $a$, having vertical recesses $b$ extending entirely through it near each end, and longitudinal bores $c$ from the ends to said recesses $b$, and the single-tree irons $g\ g$, having the slots $i\ i'$ and trace-hooks $k$, perforated at $l$, and the eye $m$ at the middle of the single-tree, of the spring-actuated bolts $d$, having eyes $e$, and the cords $n$, connected to the eyes $e$ and passed through the eye $m$ to the vehicle, substantially as specified.

In testimony that we claim the foregoing as our own we have hereto affixed our signatures in presence of two witnesses.

GEORGE DAUGHERTY.
SAMUEL THOMAS.

Witnesses:
DAN GIST,
M. W. ROCK.